United States Patent
Min

(10) Patent No.: US 12,315,947 B2
(45) Date of Patent: May 27, 2025

(54) BATTERY RACK AND ENERGY STORAGE SYSTEM INCLUDING THE SAME

(71) Applicant: LG CHEM, LTD., Seoul (KR)

(72) Inventor: Kyoung-Choon Min, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 283 days.

(21) Appl. No.: 16/980,639

(22) PCT Filed: Jan. 30, 2020

(86) PCT No.: PCT/KR2020/001441
§ 371 (c)(1),
(2) Date: Sep. 14, 2020

(87) PCT Pub. No.: WO2020/171414
PCT Pub. Date: Aug. 27, 2020

(65) Prior Publication Data
US 2021/0013558 A1 Jan. 14, 2021

(30) Foreign Application Priority Data

Feb. 21, 2019 (KR) .................. 10-2019-0020704

(51) Int. Cl.
*H01M 50/24* (2021.01)
*A62C 3/16* (2006.01)
(Continued)

(52) U.S. Cl.
CPC ............. *H01M 50/24* (2021.01); *A62C 3/16* (2013.01); *A62C 37/40* (2013.01); *H01M 10/48* (2013.01);
(Continued)

(58) Field of Classification Search
CPC .. H01M 10/482; H01M 10/486; H01M 50/20; H01M 50/24; H01M 10/48;
(Continued)

(56) References Cited

U.S. PATENT DOCUMENTS

2006/0036883 A1* 2/2006 Hashizumi .......... H01M 10/615
713/300
2010/0078182 A1* 4/2010 Alkemade .......... A62C 99/0018
169/45
(Continued)

FOREIGN PATENT DOCUMENTS

CN 206995648 U 2/2018
JP 2006-54150 A 2/2006
(Continued)

OTHER PUBLICATIONS

Machine translation of Korean Patent Publication No. KR 101939812, published Jan. 18, 2019. (Year: 2019).*
(Continued)

*Primary Examiner* — Stewart A Fraser
*Assistant Examiner* — Lilia Nedialkova
(74) *Attorney, Agent, or Firm* — Birch, Stewart, Kolasch & Birch, LLP

(57) ABSTRACT

A battery pack includes a plurality of battery modules, each battery module having at least one battery cell; a rack case configured to accommodate the plurality of battery modules, the rack case having a plurality of air circulation units; an isolation unit mounted to the rack case and configured to be slidable to expose or seal the plurality of air circulation units; and a control unit electrically connected to the isolation unit to control the sliding operation of the isolation unit.

20 Claims, 8 Drawing Sheets

(51) Int. Cl.
*A62C 37/40* (2006.01)
*H01M 10/48* (2006.01)
*H01M 50/204* (2021.01)

(52) U.S. Cl.
CPC ....... *H01M 10/482* (2013.01); *H01M 10/486* (2013.01); *H01M 50/204* (2021.01); *H01M 2200/10* (2013.01)

(58) Field of Classification Search
CPC . H01M 50/204; H01M 2200/10; A62C 37/38; A62C 37/40; A62C 3/16
See application file for complete search history.

(56) References Cited

U.S. PATENT DOCUMENTS

| | | | | |
|---|---|---|---|---|
| 2013/0265719 | A1* | 10/2013 | Eckberg | H05K 7/20536 361/701 |
| 2014/0038007 | A1* | 2/2014 | Ahn | H01M 50/204 429/62 |
| 2014/0186668 | A1 | 7/2014 | Jung et al. | |
| 2015/0004449 | A1 | 1/2015 | Lim et al. | |
| 2016/0330871 | A1* | 11/2016 | Klein | H05K 7/20145 |
| 2018/0123094 | A1 | 5/2018 | Yoon et al. | |
| 2019/0046820 | A1 | 2/2019 | Lee et al. | |
| 2019/0181406 | A1* | 6/2019 | Sugeno | H02J 3/32 |

FOREIGN PATENT DOCUMENTS

| | | | | | |
|---|---|---|---|---|---|
| JP | 3780542 | B2 | | 5/2006 | |
| JP | 2014-531231 | A | | 11/2014 | |
| KR | 10-2012-0069334 | A | | 6/2012 | |
| KR | 10-2015-0002983 | A | | 1/2015 | |
| KR | 10-1584295 | B1 | | 1/2016 | |
| KR | 2016094216 | A | * | 8/2016 | .......... H01M 2/1016 |
| KR | 10-2016-0126490 | A | | 11/2016 | |
| KR | 10-1706717 | B1 | | 3/2017 | |
| KR | 10-2018-0032122 | A | | 3/2018 | |
| KR | 10-2018-0047511 | A | | 5/2018 | |
| KR | 10-2018-0097896 | A | | 9/2018 | |
| KR | 10-1918022 | B1 | | 11/2018 | |
| KR | 10-1939812 | B1 | | 1/2019 | |
| KR | 10-2086842 | B1 | | 3/2020 | |

OTHER PUBLICATIONS

Machine translation of Korean Patent Document No. 2016094216A, published Aug. 9, 2016. (Year: 2016).*
International Search Report (PCT/ISA/210) issued in PCT/KR2020/001441 mailed on May 26, 2020.
Extended European Search Report for corresponding European Application No. 20758598.5, dated Oct. 25, 2021.

* cited by examiner

BATTERY RACK AND ENERGY STORAGE SYSTEM INCLUDING THE SAME

TECHNICAL FIELD

The present disclosure relates to a battery rack and an energy storage system including the battery rack.

The present application claims priority to Korean Patent Application No. 10-2019-0020704 filed on Feb. 21, 2019 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack by using at least one battery module and adding other components. Here, according to various voltage and capacity requirements, an energy storage system may be configured to include battery racks, each having at least one battery pack that includes at least one battery module.

The conventional energy storage system is configured to include a plurality of battery racks and a rack container that accommodates the plurality of battery racks. The rack container includes a fire extinguishing structure to cope with the risk of fire, caused by overheating or the like, which may occur due to the characteristics of a battery cell.

However, in the conventional energy storage system, since the fire extinguishing structure is provided separately from the battery racks inside the rack container, when a dangerous situation such as a fire occurs at the battery rack, the fire extinguishing structure is operated to perform detection and fire extinction only after the danger is spread to a certain degree inside the rack container.

Moreover, in the conventional energy storage system, when the fire extinguishing structure in the rack container is operated, sprinkler debris or carbon dioxide discharge debris remains in all areas of the rack container. Thus, after the dangerous situation disappears, a lot of time and cost is consumed to settle the affair later.

Therefore, it is demanded to find a way to more quickly prevent the spread of fire in the event of such a dangerous situation.

DISCLOSURE

Technical Problem

Therefore, the present disclosure is directed to providing a battery rack, which may prevent the spread of fire in the battery rack itself when a fire situation occurs, and an energy storage system including the battery rack.

Moreover, the present disclosure is also directed to providing a battery rack, which may extinguish fire in the battery rack itself when a fire situation occurs, and an energy storage system including the battery rack.

Technical Solution

In one aspect of the present disclosure, there is provided a battery rack, comprising: a plurality of battery modules, each battery module having at least one battery cell; a rack case configured to accommodate the plurality of battery modules, the rack case having a plurality of air circulators; an isolator mounted to the rack case and configured to be slidable to expose or seal the plurality of air circulators; and a controller electrically connected to the isolator to control the sliding operation of the isolator.

The isolator may include a body mounted to the rack case and electrically connected to the controller; and a sliding member coupled to be slidable from the body and configured to slide to expose or seal the plurality of air circulators.

The controller may seal the plurality of air circulators by sliding the sliding member at a preset predetermined temperature or above.

The battery rack may further comprise a temperature sensor attached to the rack case and electrically connected to the controller.

The battery rack may further comprise a fire extinguisher provided to the rack case and electrically connected to the controller, the fire extinguisher having a fire extinguishing liquid.

The controller may seal the plurality of air circulators by controlling the isolators when a temperature of the battery rack is a preset first temperature or above; and inject the fire extinguishing liquid into the rack case by controlling the fire extinguisher when the temperature of the battery rack is a preset second temperature or above.

The sliding member may be made of a flame-retardant material.

The sliding member may be made of a fire extinguishing cloth or an air-blocking sheet.

In addition, the present disclosure further provides at least one battery rack according to the above embodiments; and a rack container configured to accommodate the at least one battery rack.

The battery rack may be provided in plural, and the plurality of battery racks may be controlled independently.

In one aspect of the present disclosure, there is provided a battery rack, comprising: a plurality of battery modules, each battery module having at least one battery cell; a rack case configured to accommodate the plurality of battery modules, the rack case having a plurality of air circulators; an isolator mounted to the rack case and configured to rotate to expose or seal the plurality of air circulators; and a controller electrically connected to the isolator to control the operation of the isolator.

Advantageous Effects

According to various embodiments as above, it is possible to provide a battery rack, which may prevent the spread of fire in the battery rack itself when a fire situation occurs, and an energy storage system including the battery rack.

Moreover, according to various embodiments as above, it is possible to provide a battery rack, which may extinguish fire in the battery rack itself when a fire situation occurs, and an energy storage system including the battery rack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
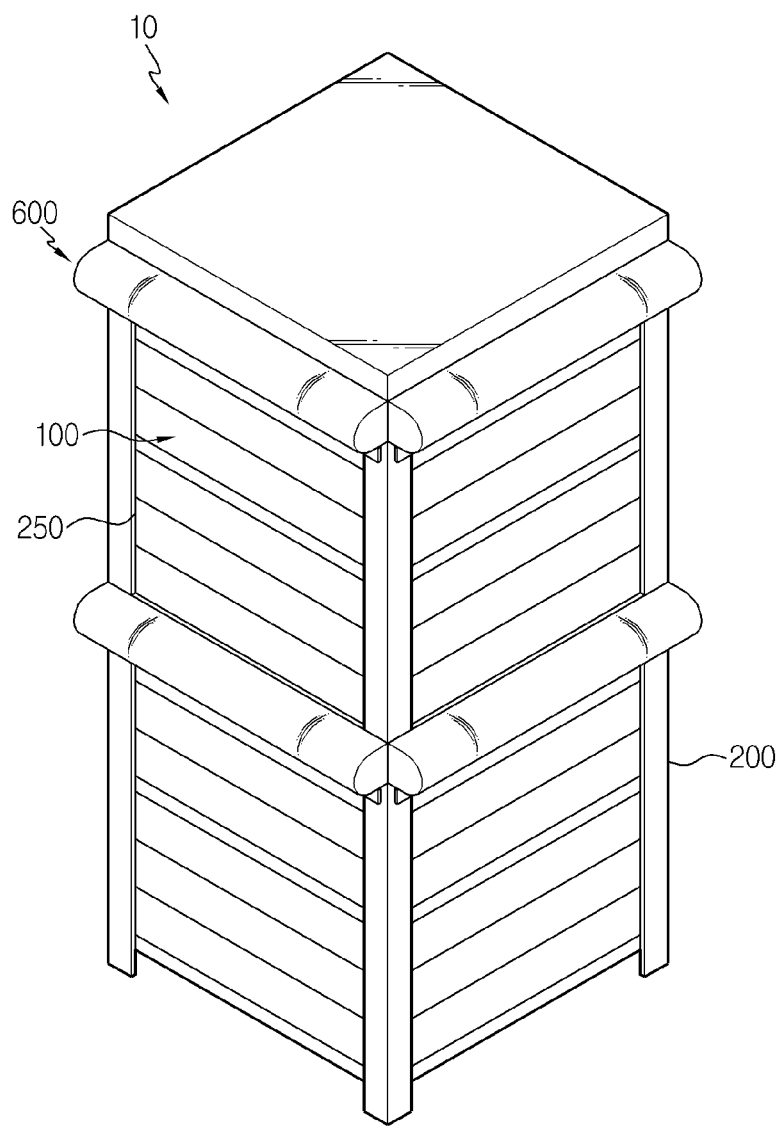
FIG. 1 is a diagram for illustrating a battery rack according to an embodiment of the present disclosure.
Figure 2:
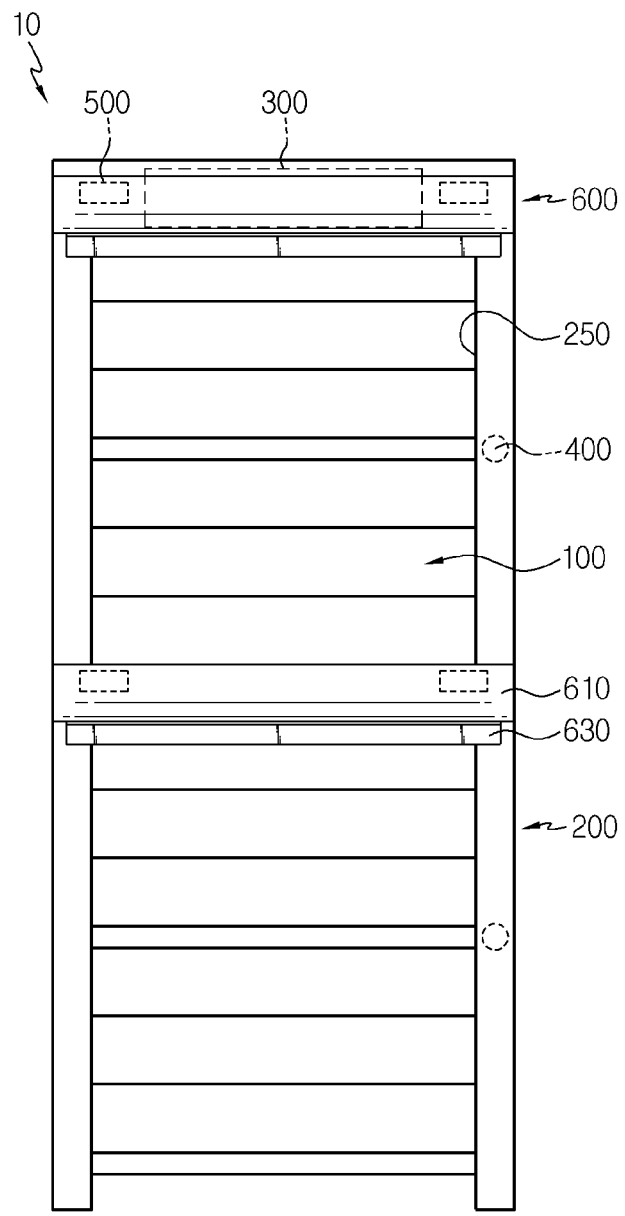
FIG. 2 is a cross-sectioned view showing the battery rack of FIG. 1.
Figure 3:
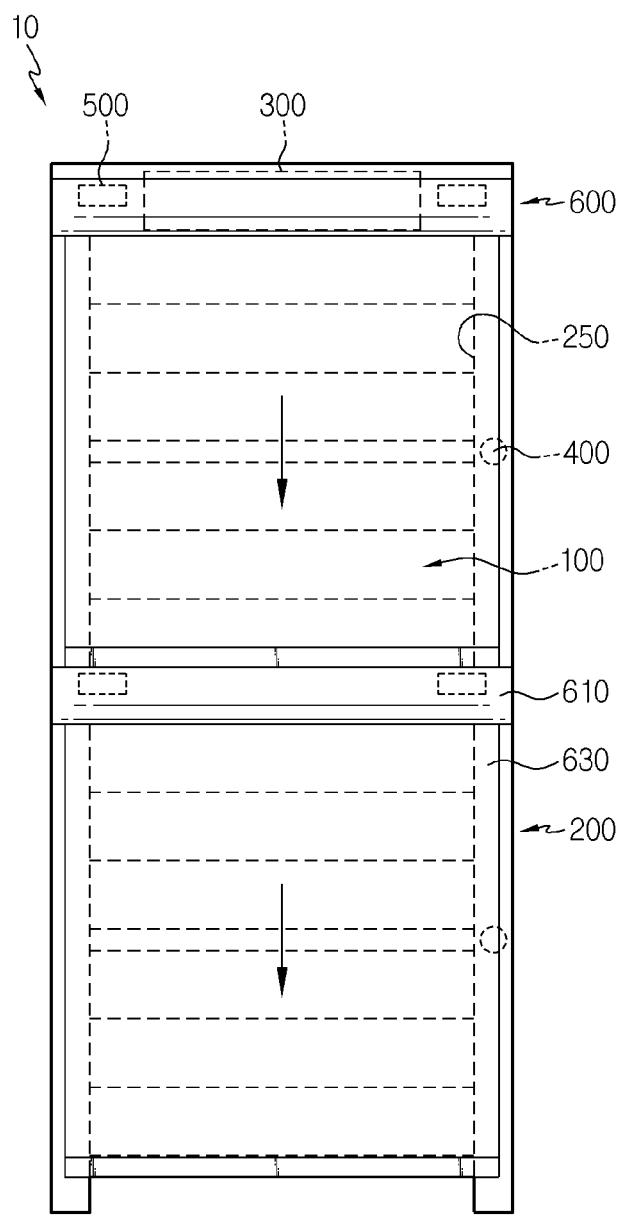
FIGS. 3 and 4 are diagrams for illustrating an operation of an isolation unit of the battery rack of FIG. 2.
Figure 4:
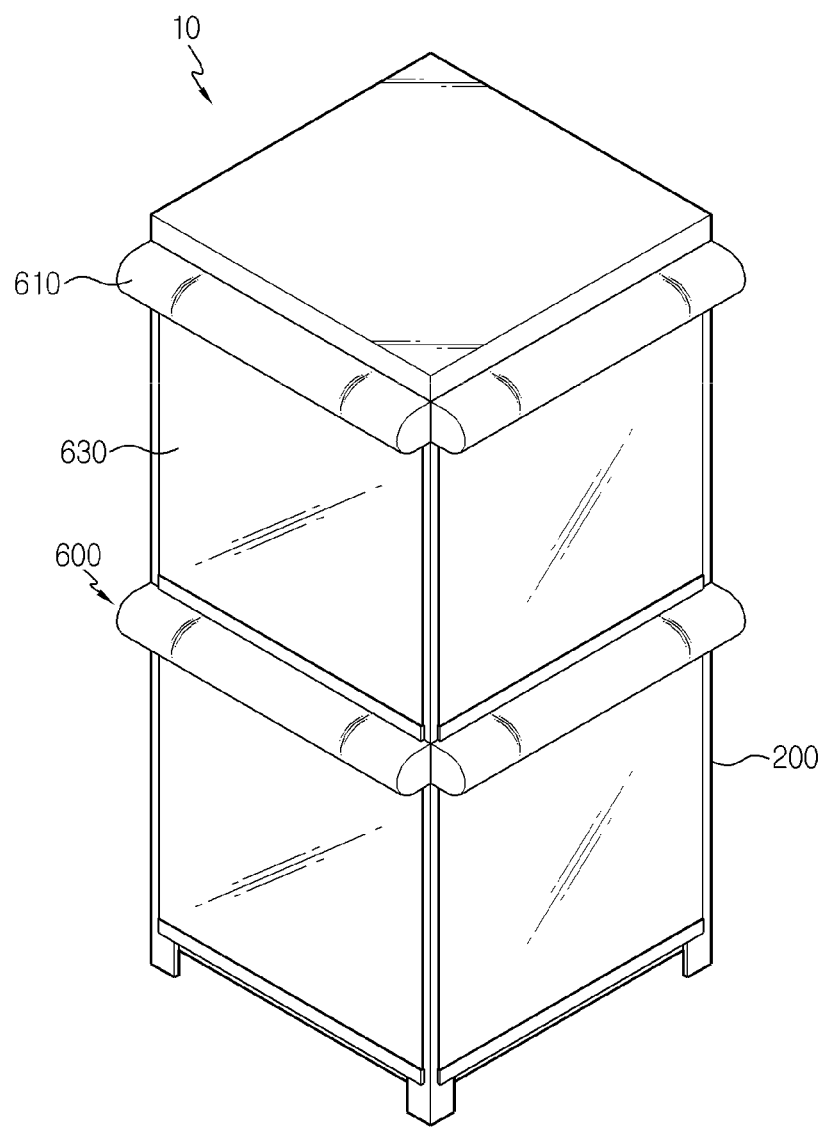
Figure 5:
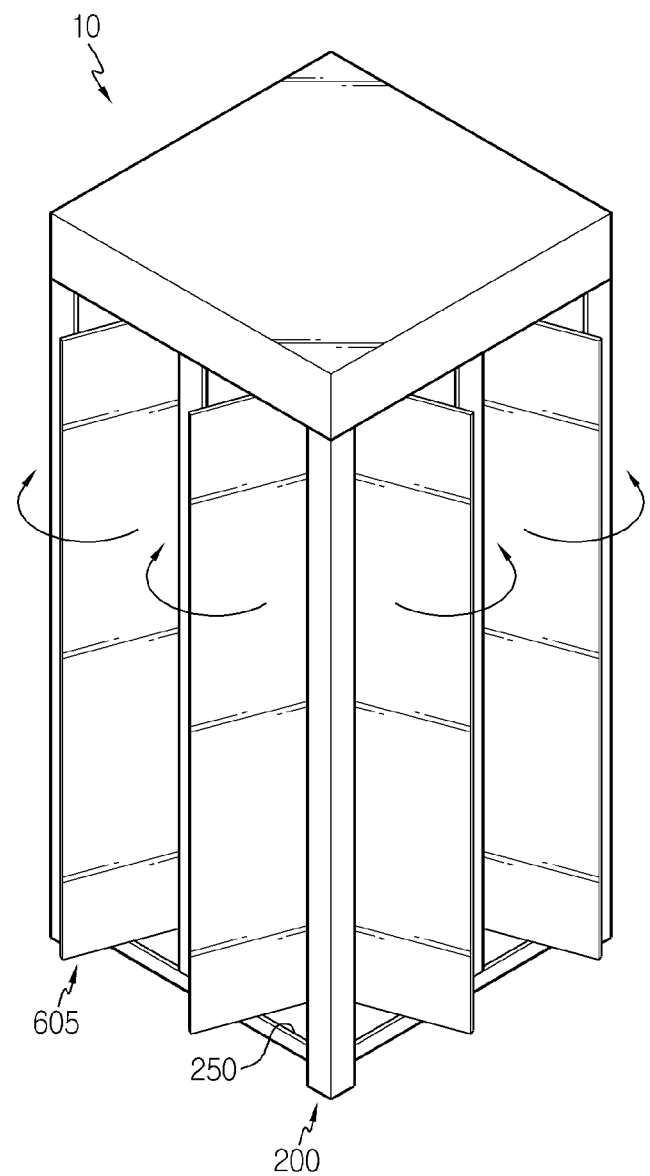
FIGS. 5 and 6 are diagrams for illustrating another embodiment of the isolation unit of the battery rack of FIG. 1.
Figure 6:
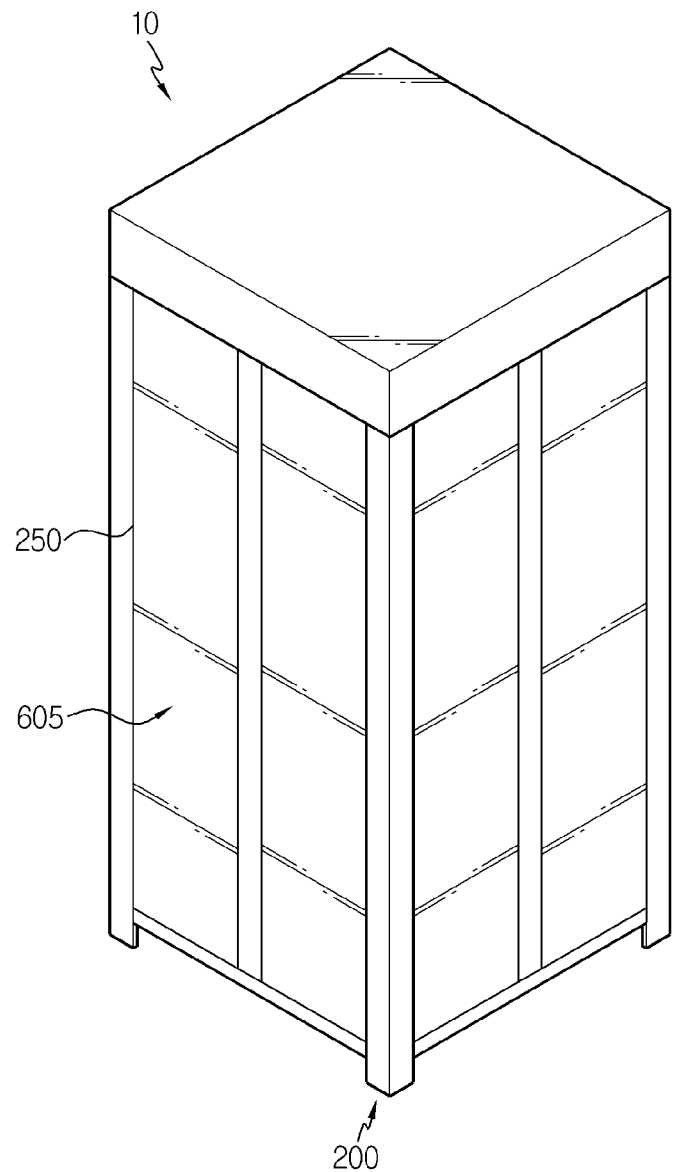

FIG. 1 is a diagram for illustrating a battery rack according to an embodiment of the present disclosure, FIG. 2 is a cross-sectioned view showing the battery rack of FIG. 1, FIGS. 3 and 4 are diagrams for illustrating an operation of an isolation unit of the battery rack of FIG. 2, and FIGS. 5 and 6 are diagrams for illustrating another embodiment of the isolation unit of the battery rack of FIG. 1.

Referring to FIGS. 1 to 6, the battery rack 10 may include a battery module 100, a rack case 200, a control unit 300, a temperature sensor 400, a fire extinguishing device 500 and an isolation unit 600.

The battery module 100 may include one or more battery cells. The battery cell is a secondary battery, and may be at least one of a pouch-type secondary battery, a cylindrical secondary battery, and a rectangular secondary battery. Hereinafter, in this embodiment, the battery cell will be described as a pouch-type secondary battery.

One battery module 100 or a plurality of battery modules 100 may be provided. Hereinafter, in this embodiment, it will be described that a plurality of battery modules 100 are provided, and each battery module 100 includes a plurality of battery cells.

The rack case 200 may accommodate the plurality of battery modules 100. To this end, the rack case 200 may have an accommodation space for accommodating the plurality of battery modules 100.

The rack case 200 may include at least one air circulation unit 250 or a plurality of air circulation units 250 for cooling the plurality of battery modules 100. Hereinafter, in this embodiment, it will be described that a plurality of air circulation units 250 are provided.

The plurality of air circulation units 250 may be formed on at least one side among a front side, both lateral sides and a rear side of the rack case 200 so that the plurality of battery modules 100 are exposed out of the rack case 200.

The control unit 300 is provided inside the rack case 200, and may perform a control function for overall operation and management of the battery rack 10. The control unit 300 may be electrically connected to the plurality of battery modules 100, the temperature sensor 400, explained later, the fire extinguishing device 500, the isolation unit 600, and the like.

The control unit 300 may control the sliding operation of the isolation unit 600, explained later. Specifically, the control unit 300 may seal the plurality of air circulation units 250 from the outside of the battery rack 10 by sliding the sliding member 630 of the isolation unit 600, explained later, at a preset predetermined temperature or above.

More specifically, the control unit 300 may control the sliding operation of the isolation unit 600 when the temperature of the battery rack 10 detected by the temperature sensor 400, explained later, is higher than or equal to the preset predetermined temperature. More specifically, the control unit 300 may seal the plurality of air circulation units 250 by controlling the isolation unit 600 when the temperature of the battery rack 10 is equal to or higher than a preset first temperature, and may inject a fire extinguishing liquid into the rack case 200 by controlling the fire extinguishing device 500, explained later, when the temperature of the battery rack 10 is equal to or higher than a preset second temperature. Here, the preset second temperature may be a higher than the preset first temperature.

The temperature sensor 400 is provided to the rack case 200, and may detect the temperature of the battery rack 10. The temperature sensor 400 may be provided in plural in the rack case 200, and may be electrically connected to the control unit 300.

The fire extinguishing device 500 is provided to the rack case 200, and may be electrically connected to the control unit 300. The fire extinguishing device 500 may be provided in plural, and may have a predetermined fire extinguishing liquid.

The isolation unit 600 may be mounted to the rack case 200 to be slidable to expose the plurality of air circulation units 250 out of the battery rack 10 or to seal the plurality of air circulation units 250 from the outside of the battery rack 10. Meanwhile, as shown in FIGS. 5 and 6, the isolation unit 605 may also be provided to expose the plurality of air circulation units 250 out of the battery rack 10 or to seal the plurality of air circulation units 250 from the outside of the battery rack 10 according to a rotational sliding operation along a horizontal direction.

At least one isolation unit 600 or a plurality of isolation units 600 may be provided. Hereinafter, in this embodiment, it will be described that a plurality of isolation units 600 are provided.

Each of the plurality of isolation units 600 may include a unit body 610 and a sliding member 630.

The unit body 610 is mounted to the rack case 200 and may be electrically connected to the control unit 300. Various components for the sliding operation of the sliding member 630, explained later, may be included in the unit body 610.

The sliding member 630 is coupled to be slidable from the unit body 610, and is capable of sliding to expose or seal the plurality of air circulation units 250.

The sliding member 630 may be made of a flame-retardant material for preventing fire spread and delaying fire. For example, the sliding member 630 may be made of a fire extinguishing cloth or an air-blocking sheet.

Hereinafter, a detailed control operation of the battery rack 10 of this embodiment when a fire situation occurs will be described in more detail.

Figure 7:
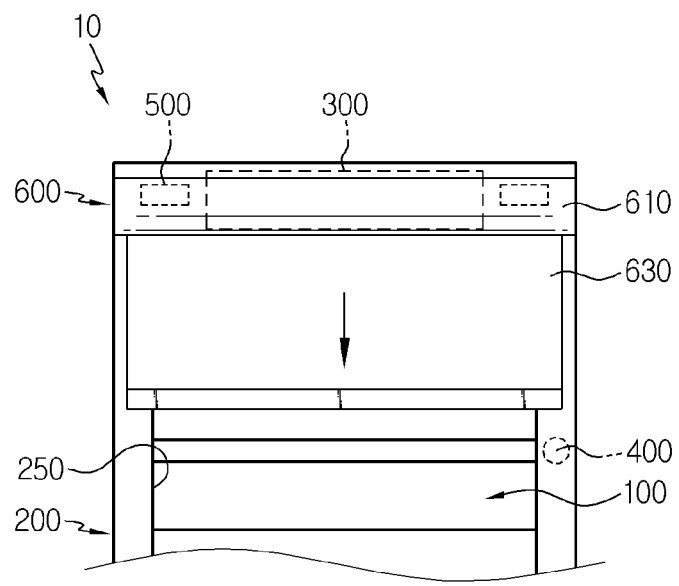
FIGS. 7 and 8 are diagrams for illustrating a control operation of the battery rack of FIG. 1 over a predetermined temperature.
Figure 8:
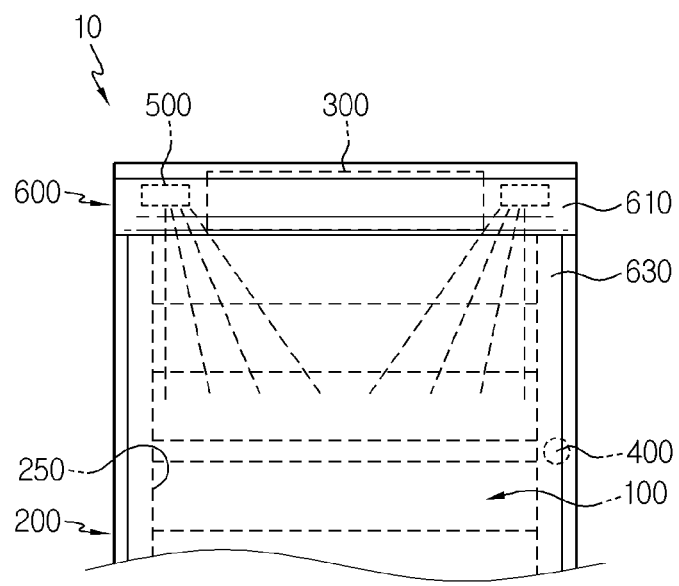

FIGS. 7 and 8 are diagrams for illustrating a control operation of the battery rack of FIG. 1 over a predetermined temperature.

Referring to FIG. 7, a dangerous situation such as a fire caused by overheating may occur in at least one of the plurality of battery modules 100 in the rack case 200 of the battery rack 10.

In this case, the control unit 300 may operate the isolation unit 600 if the temperature of the battery rack 10 detected by the temperature sensor 400 is higher than or equal to the preset first temperature. At the preset first temperature or above, through sliding of the sliding members 630 of the plurality of isolation units 600, all of the plurality of air circulation units 250 are sealed, so that the inside of the battery rack 10 may be isolated from the outside.

Accordingly, the battery rack 10 of this embodiment may more quickly prevent the spread of fire when the dangerous situation occurs.

Referring to FIG. 8, if the fire is not extinguished inside the battery rack 10 and the fire situation is maintained continuously, the temperature inside the sealed battery rack 10 may further increase.

In this case, the control unit 300 may inject the fire extinguishing liquid into the rack case 200 by controlling the fire extinguishing device 500 if the temperature of the battery rack 10 detected by the temperature sensor 400 is higher than or equal to the preset second temperature, thereby quickly extinguishing fire in the battery rack 10 itself.

As described above, in this embodiment, when the fire situation occurs at the battery rack 10, it is possible to prevent the fire from spreading in the battery rack 10 itself, and the fire extinguishing work may be performed in the battery rack 10 itself.

Figure 9:
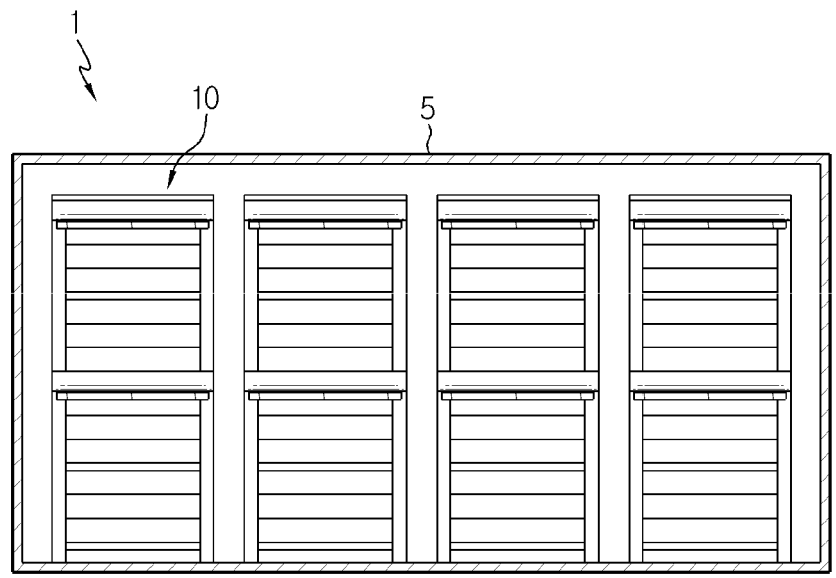
FIG. 9 is a diagram for illustrating an energy storage system according to an embodiment of the present disclosure.
Figure 10:
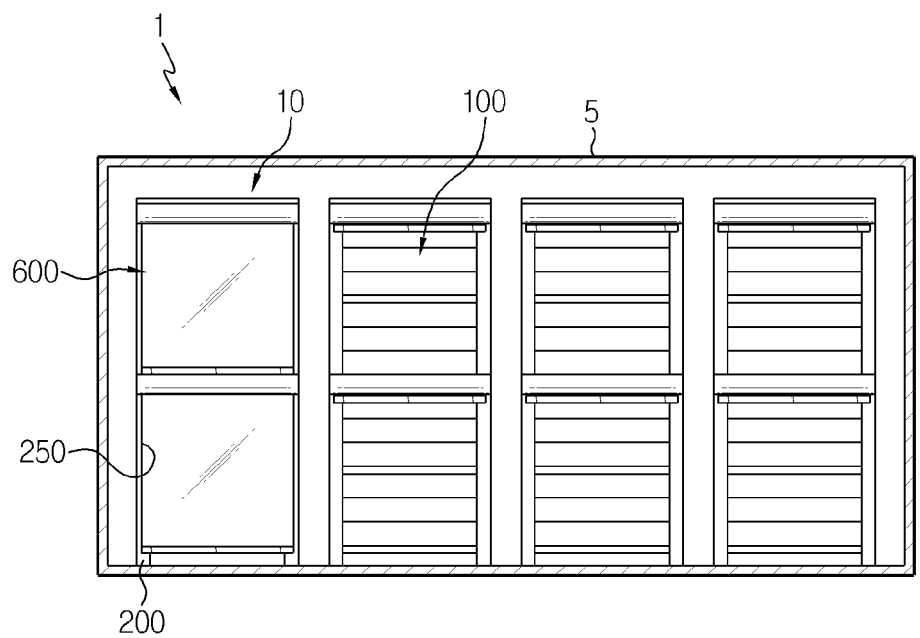
FIG. 10 is a diagram for illustrating a control operation of the energy storage system of FIG. 9.

FIG. 9 is a diagram for illustrating an energy storage system according to an embodiment of the present disclosure, and FIG. 10 is a diagram for illustrating a control operation of the energy storage system of FIG. 9.

Referring to FIGS. 9 and 10, an energy storage system 1 may be used as a household or industrial energy source. The energy storage system 1 may include at least one battery rack 10, or a plurality of battery racks 10 in the case of this embodiment, and a rack container 5 that accommodates the plurality of battery racks 10 and has a separate fire extinguishing structure. Here, the plurality of battery racks 10 may be independently controlled inside the rack container 5.

In this embodiment, when a fire situation occurs in at least one battery rack 10, the isolation unit 600 of the battery rack 10 where the fire situation occurs may operate to primarily seal the battery rack 10 where the fire situation occurs and to secondarily perform a self-extinguishing work inside the sealed battery rack 10.

Accordingly, in this embodiment, when a fire situation occurs in at least one battery rack 10 inside the rack container 5, the work for sealing and self-extinguishing the battery rack 10 is performed more quickly in the battery rack 10 itself where the fire situation occurs, thereby minimizing the risk that the fire situation may spread more greatly from the battery rack 10 where the fire situation occurs to neighboring battery racks 10.

Thus, in this embodiment, when fire occurs in any one of the battery racks 10, the fire situation may be quickly terminated. Also, even after the fire situation is terminated, it is possible to significantly reduce the time or cost required for the treatment of sprinkler debris or carbon dioxide discharge debris in all area of the rack container 5, which may be caused by the operation of the fire extinguishing structure as in the prior art.

According to various embodiments as above, it is possible to provide the battery rack 10, which may prevent the spread of fire in the battery rack 10 itself when a fire situation occurs, and the energy storage system 1 including the battery rack.

Moreover, according to various embodiments as above, it is possible to provide the battery rack 10, which may extinguish fire in the battery rack 10 itself when a fire situation occurs, and the energy storage system 1 including the battery rack 10.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery rack, comprising:
   a plurality of battery modules, each battery module having at least one battery cell;
   a rack case configured to accommodate the plurality of battery modules, the rack case having a plurality of air circulators;
   a plurality of isolators mounted to the rack case and configured to be slidable to expose or seal a respective one of the plurality of air circulators; and
   a controller electrically connected to the plurality of isolators to control the sliding operation of the plurality of isolators,
   wherein the isolator plurality of isolators is made of a flexible material,
   wherein the rack case has a top wall, a bottom wall and a plurality of side walls extending from the bottom wall to the top wall including a first side wall, and
   wherein at least two of the plurality of side walls have an isolator of the plurality of isolators.

2. The battery rack according to claim 1, wherein the each isolator of the plurality of isolators includes:
   a body mounted to the rack case and electrically connected to the controller; and
   a sliding member coupled to be slidable from the body and configured to slide to expose or seal the plurality of air circulators.

3. The battery rack according to claim 2, wherein the controller seals the plurality of air circulators by sliding the sliding member at a preset predetermined temperature or above.

4. The battery rack according to claim 3, further comprising:
a temperature sensor attached to the rack case and electrically connected to the controller.

5. The battery rack according to claim 3, further comprising:
a fire extinguisher provided to the rack case and electrically connected to the controller, the fire extinguisher having a fire extinguishing liquid.

6. The battery rack according to claim 5, wherein the controller is configured to:
seal the plurality of air circulators by controlling the isolator-plurality of isolators when a temperature of the battery rack is a preset first temperature or above; and
inject the fire extinguishing liquid into the rack case by controlling the fire extinguisher when the temperature of the battery rack is a preset second temperature or above.

7. The battery rack according to claim 2, wherein the sliding member is made of a flame-retardant material.

8. The battery rack according to claim 2, wherein the sliding member is made of a fire extinguishing cloth or an air-blocking sheet.

9. The battery rack according to claim 2, wherein the sliding member is stored within the body when the plurality of air circulators is exposed.

10. An energy storage system, comprising:
at least one battery rack as defined in claim 1; and
a rack container configured to accommodate the at least one battery rack.

11. The energy storage system according to claim 10, wherein the battery rack is provided in plural, and
wherein the plurality of battery racks are controlled independently.

12. The battery rack according to claim 1, wherein each of the plurality of side walls is formed by a first post and a second post extending from the bottom wall to the top wall, and
wherein a width of each isolator of the plurality of isolators extends from the first post to the second post.

13. The battery rack according to claim 12, wherein the first post extends from a first corner of the bottom wall to a first corner of the top wall and the second post extends from a second corner of the bottom wall to a second corner of the top wall.

14. A battery rack, comprising:
a plurality of battery modules, each battery module having at least one battery cell;
a rack case configured to accommodate the plurality of battery modules, the rack case having a top wall, a bottom wall and a plurality of air circulators;
an isolator being a panel mounted to the top wall and the bottom wall of the rack case and configured to rotate relative to at least one of the plurality of air circulators to expose or seal the at least one of the plurality of air circulators; and
a controller electrically connected to the isolator to control the operation of the isolator.

15. The battery rack according to claim 14, wherein the controller seals the at least one of the plurality of air circulators by rotating the isolator at a preset predetermined temperature or above.

16. The battery rack according to claim 15, further comprising:
a temperature sensor attached to the rack case and electrically connected to the controller.

17. The battery rack according to claim 15, further comprising:
a fire extinguisher provided to the rack case and electrically connected to the controller, the fire extinguisher having a fire extinguishing liquid.

18. The battery rack according to claim 17, wherein the controller is configured to:
seal the at least one of the plurality of air circulators by controlling the isolator when a temperature of the battery rack is a preset first temperature or above; and
inject the fire extinguishing liquid into the rack case by controlling the fire extinguisher when the temperature of the battery rack is a preset second temperature or above.

19. The battery rack according to claim 14, wherein the isolator rotates about a vertical axis of rotation.

20. The battery rack according to claim 14, wherein the isolator rotates about an axis of rotation extending through a middle of the isolator.

* * * * *